United States Patent [19]

Koch-Dücker et al.

[11] 4,430,637
[45] Feb. 7, 1984

[54] AUTOMOTIVE TRAILER CONNECTION RECOGNITION SYSTEM

[75] Inventors: Heinz-Jürgen Koch-Dücker, Edingen-Neckarhausen; Erich Junginger, Stuttgart; Eberhard Schnaibel, Hemmingen, all of Fed. Rep. of Germany

[73] Assignee: Robert Bosch GmbH, Stuttgart, Fed. Rep. of Germany

[21] Appl. No.: 296,111

[22] Filed: Aug. 25, 1981

[30] Foreign Application Priority Data

Oct. 11, 1980 [DE] Fed. Rep. of Germany ....... 3038464

[51] Int. Cl.³ ............................................. B60Q 1/00
[52] U.S. Cl. ................................ 340/52 R; 340/52 D; 340/641; 340/687
[58] Field of Search .................. 340/52 D, 52 R, 79, 340/641, 687

[56] References Cited

U.S. PATENT DOCUMENTS

| | | | |
|---|---|---|---|
| 3,660,813 | 5/1972 | Rumpf | 340/52 R |
| 3,697,974 | 10/1972 | Harris et al. | 340/52 R |
| 4,127,855 | 11/1978 | Toner | 340/52 R |

FOREIGN PATENT DOCUMENTS 2753528 7/1979 Fed. Rep. of Germany.

*Primary Examiner*—David L. Trafton
*Attorney, Agent, or Firm*—Frishauf, Holtz, Goodman & Woodward

[57] ABSTRACT

To provide an indication of the presence of a trailer connected to a vehicle, operating as a tractor, without any additional terminal or contact elements on a plug-socket connector between the electrical system of the tractor and the trailer connected thereto, a logic gate (11), preferably a NAND-element, is connected to the output line of the direction flasher circuit, or other suitable connecting line, to a low-resistance load on the trailer, for example the brake light (19a), position lights or the like, the resistance circuit element including a connection from the positive power supply through a resistor (12) having a value which is high with respect to that of the lamps on the trailer (19, 19a) so that, with the trailer disconnected, an effectively 1-signal will be applied to the logic circuit but, upon connection of a low-resistance lamp, that is, upon connection of a trailer socket, the signal at the logic gate will drop to a 0-signal although the current through the lamp is insufficient to cause lighting thereof. Energization of the respective flasher lamps, which is only short-time, may cause flashing of the indicator which can be suppressed, for example, by inclusion of an R/C circuit in the control system for the indicator lamp.

16 Claims, 4 Drawing Figures

AUTOMOTIVE TRAILER CONNECTION RECOGNITION SYSTEM

The present invention relates to automotive transportation, and more particularly to an electrical control system which will recognize and indicate to a driver of a vehicle that a trailer has been connected to the vehicle, so that the driving behavior for the pulling vehicle, hereinafter the tractor, can be adjusted to accommodate the characteristics of the trailer.

BACKGROUND

Various types of supervisory circuits have been proposed for tractor-trailer combinations, particularly if the tractor vehicle includes brake anti-lock or anti-skid systems, although the trailer does not have such an anti-lock, anti-skid system. It has been proposed—see German Patent Disclosure Document DE-OS No. 22 44 511—to include a supervisory or monitoring terminal or contact in the existing electrical connection terminal between the tractor vehicle and the trailer which, when a trailer which does not have a brake anti-lock or anti-skid system, activates a relay within the tractor which provides a continuous reminder indication signal to the driver of the tractor vehicle that a trailer is connected which has different braking characteristics from those of the tractor vehicle. This arrangement has the disadvantage that the commonly used and standard plug-socket connections between the tractor vehicle and the trailer cannot be used, requiring either adapters or re-wiring of the existing plug-socket connectors of both the trailer as well as on the tractor. This is expensive and undesirable and cannot be carried out in practice if standard tractor vehicles are to be connected to randomly selected trailers.

It has also been proposed to provide connecting terminals on the connection plugs themselves which are closed if the plug-socket connection is effected, in other words, if the plug is connected to a socket—or vice versa—upon connection of a trailer, in which the terminal are closed upon mechanical connection of the plug-socket combination. Plug-socket combinations having terminal switch elements have the undesirable characteristic of being unreliable since the terminal elements are exposed—being closed by the mechanical interconnection—and have a tendency to become dirty and make unreliable contact. This problem particularly arises in automotive use where terminals are frequently not maintained with the care that electrical equipment usually deserves. The terminals may be exposed to environmental contamination, dirt, road salt, moisture, and rain if the plug-socket combination is not effected; the reliability of such plug-socket operated connections in automotive applications is questionable and, when most needed, the electrical connections may fail. Additionally, some rewiring of the existing wiring system of the tractor vehicle, at least, is necessary.

The Invention

It is an object to provide a supervisory or recognition system which provides an output indication to the operator of a vehicle that a trailer has been connected thereto so that the operator will be reminded, particularly when braking, that the deceleration characteristics of the vehicle, now a tractor, and the trailer combination is different from that of the vehicle alone.

Briefly, a direction signal blinker wire line has a resistance sensing element connected thereto which senses a low-resistance condition connected to the line, such as, for example, occasioned by connection of a trailer with its direction signal indicators, the low-resistance sensing circuit being connected to a logic circuit which responds when a low-resistance condition is sensed to provide an output signal if at least one of the resistance sensing means—preferably one being connected to the right (R) and another one to the left (L) blinker light—shows that either one has a low-resistance circuit, lower than that of the vehicle alone.

In accordance with a preferred feature of the invention, the logic circuit is a simple NAND-element since this, then, essentially, is the only unit which is required to effect the logic function, so that only minor additional circuitry is necessary to provide an output indication. It is desirable to include a diode in the circuit connecting the blinker indication lines to the trailer in order to decouple the tractor and trailer blinker circuits, the diode being connected in conductive direction with respect to blinker current. It is possible, of course, to sense change of resistance in the supply lines for the blinker circuits and thus determine if a trailer has been coupled to the tractor vehicle; the use of the diodes substantially increases the reliability of the indicating system and insures against interference and spurious signals.

The blinker lamps, providing direction indication signals on both tractor vehicles as well as trailers, are of comparatively high power; in order to be able to handle higher currents, it is desirable to utilize relays which switch the direction signal or blinker circuits. If such relays are used, preferably two relays are provided, one for the R and one for the L direction signal lines. Each one of the relays then preferably is provided with two switching contacts, one of the switching contacts controlling power supply to the tractor, and the other to the trailer. In non-energized condition, the respective circuits of the trailer and of the tractor are then galvanically isolated from each other, which increases overall electrical system reliability of the electrical network which includes the tractor and the trailer and improves the sensing accuracy.

The output signal can be obtained in various ways; for example, if it is desirable to have an output signal of unvarying brightness, even if the directional signal blinkers are both connected—for example to provide a warning signal that the vehicle is stopped or disabled—an R/C circuit forming a timing element can be connected to the logic circuit, typically the NAND-element, so that the output signal obtained from the system, even under pulse or blinker operation, will be essentially unvarying.

The output signal can be indicated by any suitable and desirable system, for example by signal lamps, or the like. The signal, of course, can also be processed in accordance with any well known and desired arrangement and can be connected to affect the operating functions of the trailer vehicle. This is particularly advantageous if the trailer vehicle has an automatic brake anti-lock or anti-skid system.

DRAWINGS

Figure 1:
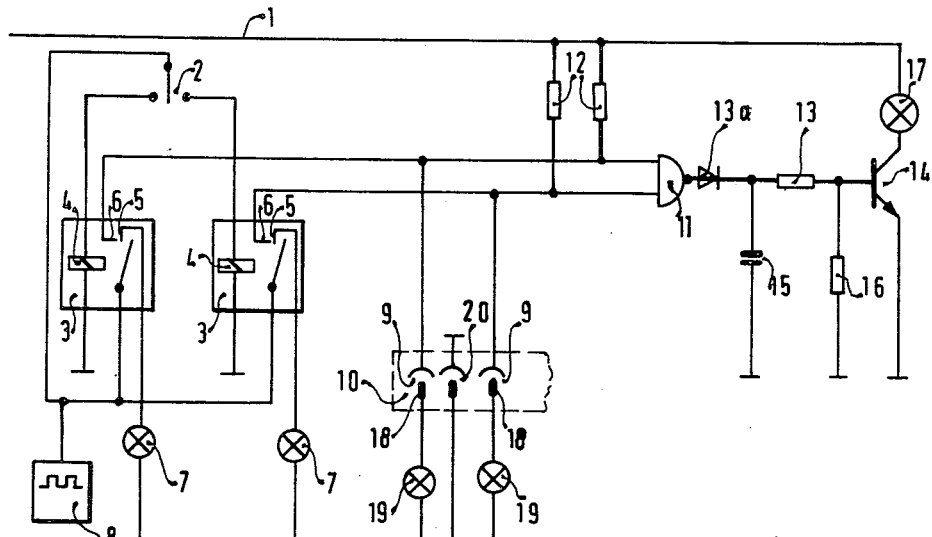
FIG. 1 is an abbreviated circuit diagram of a standard vehicular blinker system, particularly used in trucks or other similar heavy vehicles, and illustrating the additional modification to provide a trailer presence output signal, in which a circuit with dual terminal relays is used.

The basic circuit illustrated in FIG. 1 is well known in the industry, suitable, for example, for trucks. A blinker or flasher pulse generator 8 is connected to a direction signal control switch 2 which, in accordance with desired direction signal indication, activates a control unit 3 for the left side, L, and for the right side, R. The two control units 3, and identified L and R, are shown in FIG. 1. The circuit is energized from a positive bus 1, connected for example to the vehicle battery, the negative terminal of which is connected to ground or chassis Ch of the tractor vehicle. The unit 3 has a relay 4 which is connected to a respective switching terminal of the center-off direction signal switch 2; the output terminal of the unit 3 is connected to the chassis bus Ch. The relay coil 3 energizes separate relays switching terminals 5, 6, located within the relay assembly. The switching terminal of the relay is so arranged that the terminal 5 closes first, and then is connected to terminal 6. The switching contact 5 is connected to an output terminal 7' which is connected by a suitable control line to the respective left or right direction signal flasher lamp 7, the other terminal of which is connected to ground or chassis Ch. The transfer contact 2 itself is connected to a terminal 8" which, in turn, is connected to the output terminal 8' of the blinker or flasher pulse generator 8, which is energized by the vehicle battery 1. The flasher pulse generator 8 provides output pulses in a predetermined rhythm, in which the rhythm will depend on the resistance of the circuit connected thereto. The current supplied by the pulse generator and its frequency are determined by the design characteristics of the pulse generator which may include a heater element so that the frequency will be current-dependent, as well known.

The switching contact 6 of the relay 4 is connected to a terminal 9 of a trailer connection socket 10. Trailer connection sockets 10, generally, have seven terminals, and only those necessary for the present invention, are illustrated.

In accordance with the present invention, the output terminal 9' connected to the trailer terminal 9 of the relay 3—for each direction signal line—is connected to an NAND-gate 11. Further, a resistor 12 is connected between the inputs of the NAND-gate 11 and positive bus 1. The combination of the NAND-gate 11 and the resistors 12 forms a sensing circuit to determine the resistance connected to the terminal 9 of the trailer connection socket 10, and hence presence of a trailer having direction lamps, regardless of which relay 4 is energized.

The output of the NAND-gate 11 is connected through a diode 13a to a resistor 13 which is connected to the base of a transistor 14. Resistance 13 connects the base of transistor 14 to the chassis bus Ch; a capacitor 15 is connected between the diode 13 a and resistor 13 at a junction 13'. The emitter of the transistor 14 is connected to the chassis bus Ch, and the collector through a signal lamp 17 to the positive bus 1.

The socket unit 10 is adapted to cooperate with a plug having plug terminals 18, from which connecting lines extend to the direction signal lamps 19 on the trailer. The other terminals of the direction signal lamps 19 are connected to the chassis or ground bus Ch' of the trailer. A terminal connection between the plug and socket 20 connects the chassis bus Ch of the tractor to the chassis bus Ch' on the trailer to provide a continuous ground or chassis connection between tractor and trailer.

The plug-socket connection may include further connections, for example to license plate lights, position lights, and the like, which are generally indicated by the equivalent load resistance 9a connected to a plug 18a which has a terminal 9a on the tractor socket. The terminal 9a can be connected to an individual terminal similar to terminal 9' and, through a further NAND-gate 11a and, then, to a circuit essentially identical to that described in connection with the main circuit including the NAND-gate 11, that is, through the diode 13a to a terminal 13" which, in essence, corresponds to terminal 13', from which a similar network having elements 13, 14, 15, 16, 17 can be connected. In an alternative form, the additional NAND-gate 11a can be omitted and the junction between resistor 12a and the terminal 9a connected as a further input to a multiple-input NAND-gate 11, in which case the diode 13a and the further duplicate network 13, 14, 15, 16, 17 will not be necessary.

Operation: Upon first energizing the main circuit of the tractor vehicle, and if no trailer is connected to the tractor, so that the direction signal lamps 19 and the additional load 19a are absent, the NAND-gate 11 (and NAND-gate 11a, if provided) has battery voltage applied through the resistors 12, corresponding to a logic 1-signal. Thus, the output of the NAND-gate 11 will have a logic 0-signal. Transistor 14 which, essentially, is a driver transistor, will be in blocked state, so that no output indication will be available from the signal lamp 17.

The terminals 5, 6 of the relay unit 3 do not contact each other when the switch is opened, so that there is a galvanic separation between the connecting terminal 9' for the direction signal flashers of the trailer and the terminal 7' of the direction signal lamps for the tractor. Upon initiating a direction signal indication—with no trailer—relay 4 is switched in the rhythm of the blinker or flasher pulse generator 8. When the relay pulls in, the respective input of the NAND-gate 11 will receive a 1-signal due to the voltage output from the flasher pulse generator 7. This 1-signal, inverted by the NAND-function of the gate 11 will retain the transistor 14 in blocked condition and the lamp 17 will remain extinguished. If, in addition to the switch 2, an override switch is provided connecting both of the units 3 to the flasher generator, for example to provide warning output indication, the respective relays 4 will pull in only when the pulse generator 1 provides an output signal and no output will be provided from the NAND-gate 11.

Upon connection of a tractor, that is, by closing the terminals 9 and 18 and the plug-socket connector 10, direction signal lamps 19 of the tractor will be connected with the trailer. The additional inner resistance of the lamps 19 is so low that the current through the resistors 12 no longer will be sufficient in order to maintain the 1-signal at the inputs of the NAND-gate 11, so that the NAND-gate 11 will have a 0-signal thereat.

This causes the transistor 14 to conduct and lighting of the signaling lamp 17.

Upon control of the flasher lamps 19 and 7, one line (R or L) will always remain free from current so that, at the input of the NAND-gate, alternatingly, only one input will be at chassis voltage, that is, the signaling lamp 17 continues to remain energized.

Figure 2:
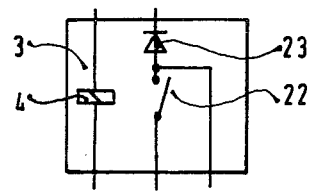
FIG. 2 is a fragementary diagram illustrating a modification of the general system of FIG. 1, using a relay with a single terminal switch and a decoupling diode.

If a warning flasher connection is desired, with a trailer connected, both relays 4 will pull in, and both inputs of the NAND-gate 11 will have a 1-signal appear thereat, which would mean that the signal lamp 17 would extinguish. Capacitor 15 is provided for this case, which charges when the transistor 14 is first connected during those short intervals in which a zero signal appears at the output of the NAND-gate 11, then discharges over the transistor 14 to prevent flashing of the signal lamp 17 which, by and itself, would not cause any damage. If, in this operating condition, flashing of the lamp is not deemed annoying by the operator of the vehicle, capacitor 15 could be eliminated. The conttrol units 3 can be constructed in various ways. In some installations, it is not desirable to utilize a terminal arrangement for the relay 4 as shown in FIG. 1, in which a terminal 5 is pressed by the operating element of the relay to the terminal 6. FIG. 2 illustrates another arrangement in which the trailer and tractor connections can be separated from each other. The unit 3' has a relay 4' which has one terminal connected to chassis and its output terminal 4a connected as in FIG. 1. The relay 4' operates a switch unit 22 which has one terminal connected to the flasher pulse generator 8, and the other over a diode 23 to the terminal 9' which, in turn, connects to the input of NAND-gate 11, and to the respective resistor 12, as well as to the terminals 9. A branch line to terminal 7' goes to the direction signal indicating lamp 7 on the tractor from the junction between the switch 22 and the diode 23.

Operation: Diode 23 decouples the flasher lamp 7 on the tractor from the flasher lamps 19 on the trailer, if connected. The low-resistance flasher lamps 7 cannot affect the inputs to the NAND-circuit 11. Current through the resistors 12 retains the inputs to the NAND-gate 11 at a 1-signal level, and no current can flow through the resistors 12 to the flasher lamps 7 on the tractor. Only if low-resistance lamps 19 are connected, that is, if the plug-socket connection 10 is engaged and the trailer is connected, will the input resistance to the NAND-gate 11 drop, placing them at essentially 0-signal level, thus controlling transistor 14 to unblock, and lighting of lamp 17. The remaining operation of the circuit is similar to that described in connection with FIG. 1.

Figure 3:
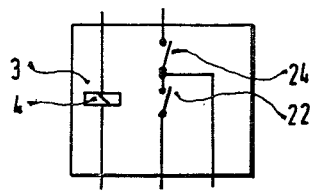
FIG. 3 is a diagram similar to FIG. 2, and illustrating another embodiment of a relay with two separate switching terminals.

Embodiment of FIG. 3: The unit 3" has a relay 4", connected as before. The relay 4" has switch contacts 22, 24 conjointly operated upon energization of the relay coil. The first contact 22 is connected to the output of the flasher or blinker pulse generator 8 at terminal 8'. A second moving contact 24 is provided which is connected to output terminal 9' and hence to the input of the NAND-gate 11 and to the plug-socket connector 10. The flasher lamps on the tractor are connected to output terminal 7'.

Operation

The lamps 7 connected to terminal 7' are galvanically separated from the lamps 19, unless the relay is operated, by the separate switch blade 24. Switch blades 22 and 24 are opeerated in unison. The low resistance of the lamp 7 thus will not feed back to the terminal 9' so that the NAND-gate 11 can truly sense the resistance on the terminals 9', that is, if the lamps 19 are connected or not. Upon energization of the relay coil 4", blinker or flasher pulse generator 8 will provide a 1-signal. The operation of the element 3" of FIG. 3 thus is essentially identical to that described in connection with FIG. 1.

Figure 4:
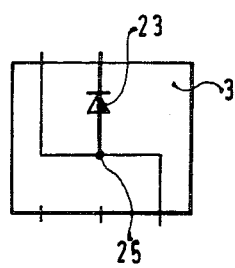
FIG. 4 is another fragmentary diagram, illustrating a modification without relay connection.

If the switch 2 is constructed to carry substantial current, further simplification of the unit 3 can be achieved, as illustrated in the circuit of FIG. 4, in which a diode 23 is used, again, to effect decoupling of the lamps 7 and 19, so that the NAND-gate 11 and resistors 12 will sense the resistance condition on terminal 9' independent of the resistance condition on terminal 7'. The switch 2 is then connected directly to a junction 25 which, on the one hand, is connected through terminal 7' to the tractor flasher lamps 7 and, on the other, through the diode 23 to terminal 9' for further connection to the trailer flasher lamps 19 through the plug-socket connector 10, as well as to the NAND-gate 11 and the resistors 12.

Operation

Upon operating the flasher switch 2, lamp current is supplied from the blinker pulse generator 8 through the switching contacts of the switch 2 to the respective lamps. The terminals of the flasher control switch 2 must be so heavy that they can switch the lamp current. Operation of the circuit is essentially identical to that described in connection with FIG. 2. Omitting the relay 4 which, in the system of FIGS. 1 and 3, is necessary for both right and left sides, thus permits a simpler and more inexpensive construction provided the switch 2 is made heavier, since only diodes 23 will be needed, which are cheaper elements than relays.

Various changes and modifications may be made which are, essentially, based on the principle of sensing connected resistance, that is, the presence of low-resistance lamps in a trailer which drop 1-signals at the input of the logic gate 11 to a 0-signal, and thus trigger an indication. The reliability of indication can be further improved by utilizing additional connected lamps, for example the rear-position lamps or the brake lamps, and to connect them with suitable decoupling elements, such as diodes and the like, to one or more indicator lamp 17.

For permanent energization of the respective relays 4, 4', 4", for example during an extended turing maneuver, terminal 8" can also be connected to terminal 1 of the power supply, rather than to the output 8' of the blinker or flasher pulse generator, flashing pulses being supplied by the connection from the output of the flasher pulse generator 8' directly to the switching blade of the respective relays for intermittent operation of the indicator lamps 7, 19, respectively.

Basically, thus, the system senses the resistance condition of the terminals or lines 9' which may, or may not, be connected to low-resistance lamps 19, regardless of the energization state of the lamps 9'; and if flashing of the indicator lamp 17 is undesired, the R/C circuit 13/15 can be provided to suppress intermittent operation thereof.

Various other changes and modifications may be made, and features described in connection with any one of the embodiments may be used with any of the others, within the scope of the inventive concept. The important feature is that the resistors 12 provide a 1-signal to the logic gate 11 if no lamps are connected, but the current flow through the resistors 12 is so low that the lamps 19 will not light unless energized upon operation of the switch 2.

In a suitable embodiment, the resistors 12 had a value of 1 K Ω, for use with lamps 19 of the commercial type 12 volt, 2 wall e.g. O, ram F506 drawing, under 12 V operation, a current of 1.15 A. The NAND-gate 11 may be of the type RCA e.d. 4011B.

In an alternative connection, the blinker pulse generator 1 supplies pulses only to the relay coils 4 of the blinker relays, and the relay switching terminal shown in FIG. 1 to be connected to output terminal 8' of the blinker pulse generator can then be connected to the positive bus 1 of the power supply system to supply full power through the relay switching contacts to the lamps, rather than the output from the blinker pulse generator.

We claim:

1. Automotive trailer connection recognition system for use with a tractor electrical system comprising:
   power supply buses (1, Ch);
   a blinker system on the tractor including means (8) generating blinker pulses;
   at least two tractor blinker lamps (7) of a first predetermined resistance on the tractor;
   a blinker switch (2, 3, 3', 3'', 3''') selectively controlling connection of at least one of the blinker lamps (7) to the blinker pulse generator means (8);
   a severable trailer connector (10);
   at least two trailer blinker lamps (19, 19a) of a second predetermined resistance connected to the trailer connector (10:
   connection means (9') connecting the blinker switch means to the trailer connector (10) for severable connection to the trailer blinker lamps;
   resistance sensing means (11, 12) connected to said connection means (9') including logic means (11) recognizing a high-resistance or low-resistance condition on said connection means (9') and providing an outtput signal if the resistance sensing means senses a connected low-resistance condition on said connection means;
   and mean (5, 6; 22, 23, 24) for isolating the at least two tractor blinker lamps (7) on the tractor from said connection means (9') unless said lamps are energized from said power supply buses (1, Ch).

2. System according to claim 1, wherein two connection means (9') are provided, each one connected to a respective circuit (R, L) of the tractor blinker or flasher switch means (2, 3, 3', 3'', 3''');
   and said logic means (11) is connected to each one of said connection means and provides an output signal if the resistance of at least one of said connection means senses a low-resistance condition.

3. System according to claim 2, wherein the logic means comprises a NAND-gate.

4. System according to claim 1, wherein the isolating means includes at least one diode (23) connected between said blinker switch means (2, 3, 3', 3'', 3''') and the connection means (9') connecting the blinker switch means and the trailer connector (10) for severable connection of trailer lamps (19, 19a).

5. System according to claim 1, wherein a relay (4, 4', 4'') is provided having two switching terminals (5, 6) which, respectively, are connected to the tractor blinker lamps (7) and to the connection means (9') for connection to the trailer connector and hence to the trailer blinker lamps (19), said relay terminals (5, 6; 22, 24) being galvanically separated from each other when the relay is de-energized and forming said isolating means.

6. System according to claim 1, further including a time storage circuit (13, 15) connected to the output of the resistance sensing means to maintain the output signal at the level determined by the sensed resistance even though, for a short time, the input to the logic means (11) may change.

7. System according to claim 1, further including an indicator lamp circuit (14, 17) connected to receive the output signal from said logic means and providing an indication that the logic means has sensed a low-resistance condition, indicative of connection of at least one lamp (19, 19a) to the trailer connector (10) and hence a low-resistance condition at the input to the logice means.

8. System according to claim 1, further including operating switch means (14) connected to and controlled by the output signal from said resistance sensing means for switching an operating element (17) located on the tractor to different states in dependence on whether the resistance condition at said connection means is sensed to be a low-resistance or high-resistance condition.

9. System according to claim 1, wherein the trailer has low-resistance loads (19a) associated therewith, said low-resistance loads being connected to said trailer connector;
   and the resistance sensing means (11, 12) is connected to the respective terminal on the trailer connector for said low-resistance loads (19a) to provide an output signal if said respective terminal has a low-resistance load connected thereto, indicative of coupled connection of the trailer connector, of if the terminal is at a high-resistance level, indicative of uncoupled condition of the trailer connector.

10. System according to claim 1, wherein said isolating means comprises a diode.

11. System according to claim 1, wherein said isolating means comprises galvanically isolated relay switching contacts (5, 6; 22, 24).

12. System according to claim 8, wherein said isolating means comprises a diode.

13. System according to claim 8, wherein said isolating means comprises galvanically isolated relay switching contacts (5, 6; 22, 24).

14. Automotive trailer connection recognition system for use with a tractor electrical system having
   a power supply bus (1, Ch);
   controlled connection means (9') selectively energizable on said tractor;
   low-resistance electrical components positioned on the tractor;
   means (3, 4) for selectively energizing the controlled connection means (9') to the severable tractor connector;
   a trailer connector connected to said controlled connection means (9') and having a tractor terminal (9, 9a) and a trailer terminal (18, 18a), said respective tractor and trailer terminals being severable from each other;
   a low-resistance load (19, 19a) connected to said trailer terminal;
   resistance sensing means (11, 12) on said tractor, connected to the tractor electrical system and to the tractor connection terminal (9) and sensing connected resistance condition at the tractor terminal (9), said resistance sensing means providing an output signal indicative of the resistance condition at an input thereof to thereby provide an output signal if a low-resistance load (19, 19a) is connected at the severable connector, and thus provides a signal indicative of the presence or absence of a connected trailer; and means (5, 6; 23; 22, 24) for respectively isolating the low-resistance electrical components (7) positioned on the tractor from said connection means unless said low-resistance components are energized.

15. System according to claim 14, wherein said isolating means comprises a diode.

16. System according to claim 14, wherein said isolating means comprises galvanically isolated relay switching contacts (5, 6; 22, 24).

* * * * *